(12) United States Patent
Bacastow et al.

(10) Patent No.: US 12,518,294 B1
(45) Date of Patent: Jan. 6, 2026

(54) METHOD AND SYSTEM FOR NUMERIC TRANSLATION

(71) Applicant: Payouts Network, Inc., Cumming, GA (US)

(72) Inventors: Steve Bacastow, Cumming, GA (US); Eric Stoffel, Cumming, GA (US); Giancarlo Stefano Paredes, Jurupa Valley, CA (US)

(73) Assignee: Payouts Network, Inc., Bozeman, MT (US)

( * ) Notice: Subject to any disclaimer, the term of this patent is extended or adjusted under 35 U.S.C. 154(b) by 234 days.

(21) Appl. No.: 17/387,164

(22) Filed: Jul. 28, 2021

Related U.S. Application Data

(60) Provisional application No. 63/058,316, filed on Jul. 29, 2020.

(51) Int. Cl.
| | | |
|---|---|---|
| *G06Q 30/0226* | (2023.01) | |
| *G06Q 20/02* | (2012.01) | |
| *G06Q 20/06* | (2012.01) | |
| *G06Q 20/38* | (2012.01) | |
| *G06Q 20/40* | (2012.01) | |

(52) U.S. Cl.
CPC ....... *G06Q 30/0227* (2013.01); *G06Q 20/027* (2013.01); *G06Q 20/06* (2013.01); *G06Q 20/3821* (2013.01); *G06Q 20/401* (2013.01); *G06Q 2220/00* (2013.01)

(58) Field of Classification Search
CPC .. G06Q 30/0227; G06Q 20/027; G06Q 20/06; G06Q 20/3821; G06Q 20/401; G06Q 2220/00
See application file for complete search history.

(56) References Cited

U.S. PATENT DOCUMENTS

| | | | |
|---|---|---|---|
| 11,049,349 B2 * | 6/2021 | Onischuk | G07C 13/00 |
| 2011/0112901 A1 * | 5/2011 | Fried | G06Q 30/0251 705/14.49 |
| 2012/0179907 A1 * | 7/2012 | Byrd | H04L 9/3268 713/156 |
| 2016/0012465 A1 * | 1/2016 | Sharp | G06Q 20/321 705/14.17 |
| 2016/0260067 A1 * | 9/2016 | Holman | G06Q 20/22 |
| 2016/0260069 A1 * | 9/2016 | Holman | G06Q 30/06 |
| 2017/0346851 A1 * | 11/2017 | Drake | H04L 9/0838 |
| 2018/0075104 A1 * | 3/2018 | Oberbreckling | G06F 16/254 |
| 2019/0102574 A1 * | 4/2019 | Roberts | G06N 5/01 |

FOREIGN PATENT DOCUMENTS

KR 102243935 B1 * 4/2021

* cited by examiner

*Primary Examiner* — Neha Patel
*Assistant Examiner* — Davida Lee King
(74) *Attorney, Agent, or Firm* — Workman Nydegger

(57) ABSTRACT

A computer system for numeric translation within digital financial transactions comprises various obfuscation tables and remote systems that each manage particular portions of private data. Each remote system utilizes a unique obfuscation layer to protect private data from being communicated to other systems.

23 Claims, 9 Drawing Sheets

METHOD AND SYSTEM FOR NUMERIC TRANSLATION

CROSS-REFERENCE TO RELATED APPLICATIONS

This application claims the benefit of and priority to U.S. Provisional Patent Application Ser. No. 63/058,316 filed on 29 Jul. 2020 and entitled "METHOD AND SYSTEM FOR NUMERIC TRANSLATION," which application is expressly incorporated herein by reference in its entirety.

COPYRIGHT NOTICE

A portion of the disclosure of this patent document may contain material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Computers and computing systems have affected nearly every aspect of modern living. Computers are generally involved in work, recreation, healthcare, transportation, entertainment, household management, etc. Computers have also had a major impact on the financial industry. Due to the increased availability of mobile phones, merchants have established systems that allow users to make payments with their mobile phones, buy and sell equities with their mobile phones, join loyalty programs on their mobile phones, and perform various other financial functions.

As the prevalence of these digital transactions have increased so has the need for increased security and privacy measures. More and more users are becoming wary of exposing their financial accounts to exploitation from hackers. Similarly, users are also becoming wary of sharing private information with both bad actors and private companies. Companies, in particular, are able to leverage private information received from users to create highly detailed and accurate descriptions of the user. Accordingly, there is significant room within the fields of security and privacy for improvements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments comprise a computer system for numeric translation within digital financial transactions. The computer system may be implemented as a single instance of a computing device or divided among various remote computing devices. For example, disclosed embodiments include an intermediary payment network computer system comprising a first processor and a first computer-readable media having stored thereon executable instructions that when executed by the first processor configure the intermediary payment network computer system to perform various acts. For instance, the intermediary payment network computer system receives, through a network connection, a digital auth notification from a primary payment network affiliated with a merchant. The digital auth notification is automatically communicated to the intermediary payment network computer system when a user performs a digital financial transaction with a merchant using a point-of-sale device or ecommerce site. Additionally, the digital auth notification comprises a user financial account number, a transaction ID, and a transaction amount value. The intermediary payment network first maps the financial account number to a client identification value. Having determined the client identification value, the intermediary payment network computer system maps the transaction amount value to a first obfuscation value within a first obfuscation dataset that is associated with the client identification value. The first obfuscation dataset comprises at least the first obfuscation value and at least a second obfuscation value. Both the first obfuscation value and the second obfuscation value are associated with different non-overlapping ranges corresponding to potential transaction amount values. The intermediary payment network computer system also maps the user financial account number to a user identification number within a user mapping dataset that is associated with the client identification value. The intermediary payment network computer system then communicates the first obfuscation value and the client identification value to a third-party loyalty program computer system.

Disclosed embodiments may also comprise the third-party loyalty program computer system comprising a second processor and a second computer-readable media having stored thereon executable instructions that when executed by the second processor configure the third-party loyalty program computer system to perform various steps. For example, the third-party loyalty program computer system calculates an adjusted transaction value by multiplying a first parameter value with the first obfuscation value. The third-party loyalty program computer system also looks up, at the third-party loyalty program computer system using the client identification value and the user identification number, a current rewards balance amount associated with the user identification number within a client rewards balance dataset. The third-party loyalty program computer system then maps the adjusted transaction value to a rewards obfuscation value within a rewards obfuscation dataset. The rewards obfuscation value is associated with an upper threshold of the rewards balance corresponding to a value that is less than the adjusted transaction value. Additionally, the third-party loyalty program computer system calculates a finalized awards amount by multiplying a second parameter with the rewards obfuscation value. The third-party loyalty program computer system communicates a finalized rewards amount as an offer to a user device.

Disclosed embodiments may further comprise the user device comprising a third processor and a third computer-readable media having stored thereon executable instructions that when executed by the third processor configure the user device to perform various steps. For example, the user device displays, on a user interface at the user device, a notification to accept the rewards offer value as a digital financial payment award.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

DETAILED DESCRIPTION

Figure 1:
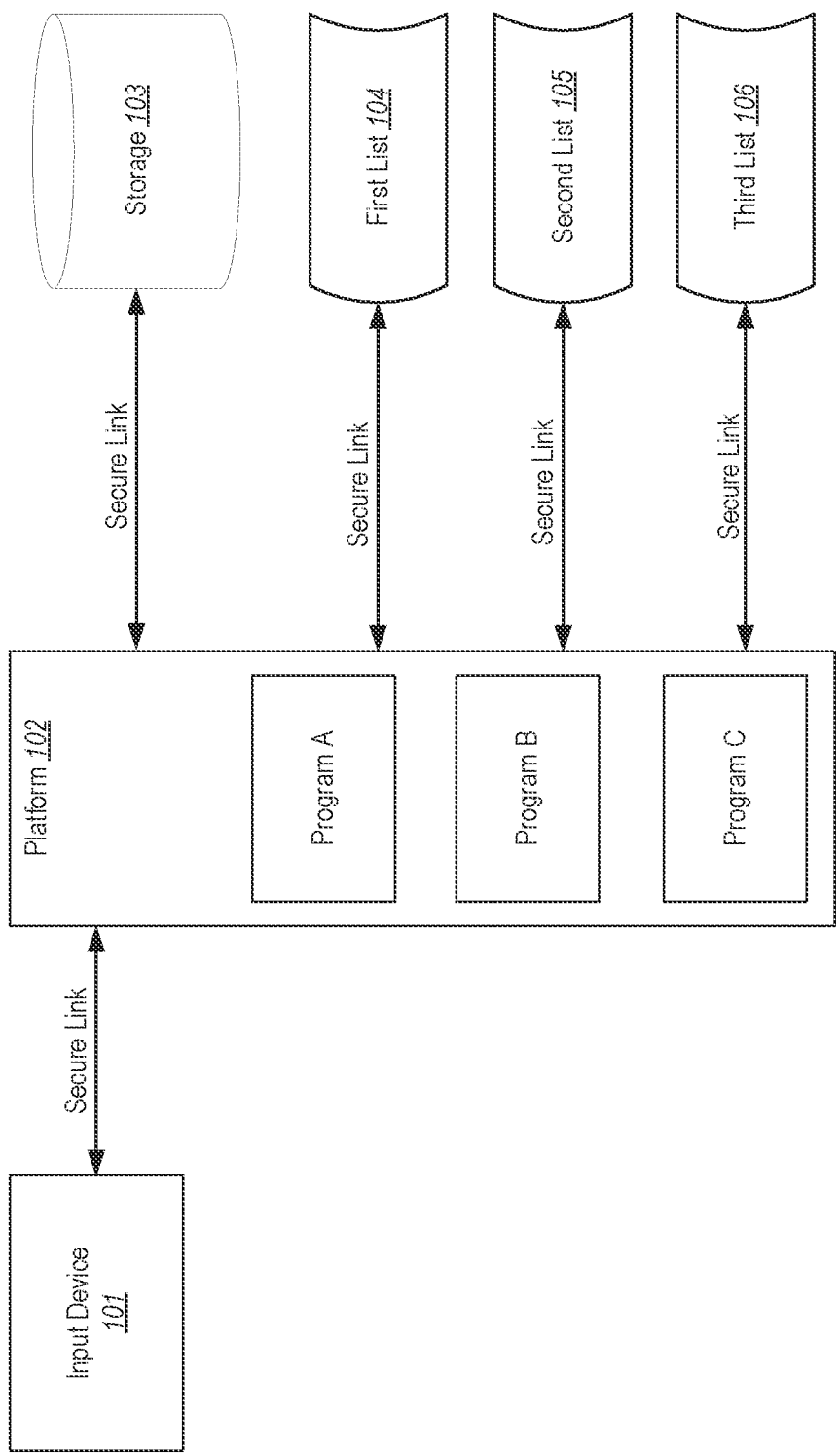
FIG. 1 illustrates a schematic diagram of components in an embodiment of a system for numeric translation.

Disclosed embodiments provide significant advances relating to security and privacy protections for users of digital currency transactions. Specifically, disclosed embodiments obscure the private information that is communicated within a user's transactions to third parties. In at least one embodiment, a rewards program may wish to securely and privately integrate its user rewards into their daily purchase interactions. For example, it may be desirable that when a user makes a purchase at a participating retailer, the user's mobile device emits a notification that informs that user that a specific amount of digital reward is available to the user to apply towards the recent purchase. If the user desires, the user can accept the reward and have the total purchase price reduced by the specific amount of digital reward.

During this rewards process there is the potential for several pieces of highly private and identifiable information to be passed through potentially unsecure digital communication channels. Additionally, this information could be used by parties along the communication pathway to derive personal information about users that the users want to keep private. For instance, a user may purchase a particular item for a specific amount of money (e.g., $7.53). This purchase amount is communicated to the credit card company to process the payment.

One of skill in the art will appreciate the data point of the $7.53 purchase amount is itself highly valuable information for tracking an individual and deriving their purchasing habits. For example, a data mining company can track specific purchase amounts and purchase frequencies to determine the actual products that are being purchased by a user. As a simple example, the data mining company may cross-correlate this information with other information known about the user and determine that the user is purchasing a specified medical test. Using this information the data mining company may be able to make further intrusive correlations into the user's life.

At least one embodiment of the present invention provides a technical solution to protect a user's privacy as the user makes digital purchases and leverages rewards points within those purchases. For example, in at least one embodiment, a computer system for numeric translation within digital financial transactions comprises an intermediary payment network computer system comprising a first processor and a first computer-readable media having stored thereon executable instructions that when executed by the first processor configure the intermediary payment network computer system to perform various steps for protecting a user's privacy.

For instance, the intermediary payment network computer system may be configured to be an intermediary between a user and various rewards programs. As such, the intermediary payment network computer system is able to identify when a user makes a purchase and then provide the user with an option to redeem rewards points based on that purchase. In providing this service, the intermediary payment network computer system is communicating with primary payment networks (e.g., credit card companies), third-party loyalty programs, and user devices. In at least one embodiment, the intermediary payment network computer system implements technical protective features that protect the private data of the user throughout these communications.

For example, in at least one embodiment, the intermediary payment network computer system receives, through a network connection, a digital auth notification (also referred to an "authorization notification") from a primary payment network, such as a credit card company. The digital auth notification is automatically communicated to the intermediary payment network computer system when a user performs a digital financial transaction using a registered financial account at a pre-designated merchant or pre-designated group of merchants using a point-of-sale or ecommerce site. In at least one embodiment, the digital auth notification comprises a user financial account number, transaction ID, and a transaction amount value.

Once received by the intermediary payment network computer system, the intermediary payment network computer system maps the transaction amount value to a first obfuscation value within a first obfuscation dataset that is associated with the client identification value. As used herein, the "first obfuscation dataset" comprises at least the first obfuscation value and at least a second obfuscation value, both the first obfuscation value and the second obfuscation value being associated with different non-overlapping ranges corresponding to potential transaction amount values. For example, the first obfuscation dataset may comprise a dataset of $5, $10, $15, and $20. The first obfuscation value would be the value within the first obfuscation dataset that is immediately less than the transaction amount value. For instance, if the transaction amount value was $7.53, then the first obfuscation value would be $5. In contrast, if the transaction amount value was $50 then the first obfuscation value would be $20. Further, if the transaction amount value was $4.98 then the first obfuscation dataset would not return a first obfuscation value. The preceding purchase amount obfuscation process can be implemented as described in FIGS. 7A and 7B in relation to the Process Auth function 710.

In at least one embodiment, the intermediary payment network computer system comprises multiple different obfuscation datasets that are each provided by various third-party loyalty programs. Furthermore, different obfuscation datasets may correspond to specific clients or groups of clients represented by a third-party loyalty program. As such, each third-party loyalty program can determine the increments at which they want to issue rewards, though, the intermediary payment network computer system may place requirements on the obfuscation datasets to ensure that monetary transactions are sufficiently obfuscated. The intermediary payment network computer system uses a client identification value, which is associated with a particular bank of a participating third-party loyalty program, to identify the correct obfuscation dataset. Accordingly, in at least one embodiment, the obfuscation datasets provide significant protections to a user's privacy by dramatically reducing the useful information that is provided to third-parties by obfuscating the actual transaction amount value.

The intermediary payment network computer system also maps the user financial account number to a user identification number within a user mapping dataset that is associated with the client identification value. For example, in at least one embodiment, the intermediary payment network computer system receives a user financial account number in the form of the user's credit card number. The user's credit card number is highly private data that needs to be treated with the utmost security. Accordingly, to obscure this sensitive data, the intermediary payment network computer system maps the credit card number to a user identification number that is stored within a user mapping dataset.

The intermediary payment network computer system may comprise multiple user mapping datasets that are each provided by a different third-party loyalty program. The intermediary payment network computer system may utilize the client identification value to determine the correct user mapping dataset. The intermediary payment network computer system then extracts the user identification number from the user mapping dataset and utilizes the user identification number when communicating with the third-party loyalty program. The preceding user obfuscation process can be implemented as described in FIGS. 7A and 7B in relation to the Process Transaction Function 718.

The intermediary payment network computer system then communicates the first obfuscation value and the client identification value to a third-party loyalty program computer system. Accordingly, the intermediary payment network computer system is configured to protect personally identifiable data of a user by obfuscating both the actual transaction amount value and the user financial account number when communicating with the third-party loyalty programs.

The intermediary payment network is also operable to control or limit the number and frequency of offers that can be presented to a user. This embodiment can be implemented as throttling criteria as described in FIGS. 7A and 7B in relation to the Process Transaction Function 718.

Turning now to the functions performed by the third-party loyalty program computer system, the third-party loyalty program computer system comprises a second processor and a second computer-readable media having stored thereon executable instructions that when executed by the second processor configure the third-party loyalty program computer system to perform various steps for protecting a user's privacy. In at least one embodiment, the third-party loyalty program computer system calculates an adjusted transaction value by multiplying a first parameter with the first obfuscation value. For example, each third-party loyalty program may have a specific ratio of rewards point to dollars. For instance, 100 rewards points may be worth 1 dollar. As such, the third-party loyalty program multiplies the first obfuscation value by 100 to determine an adjusted transaction value that is representative of the equivalent value in rewards points of the user's obfuscated purchase transaction. For example, an obfuscated purchase transaction amount of $35 may be multiplied by a first parameter of 1000 to calculate an adjusted transaction value of 35,000 points.

Upon generating the adjusted transaction value, the third-party loyalty program computer system looks up, using the user identification value, a current rewards balance amount within a rewards balance dataset. The rewards balance dataset comprises a listing of at least a subset of users who are associated with the client's rewards program. Each user in the subset has an entry within the reward balance dataset and information indicating how many rewards points that user has within the client's reward program. Accordingly, the third-party loyalty program computer system determines the current rewards balance amount associated with the user.

The third-party loyalty program computer system then calculates the required loyalty points for a potential rewards offer value by multiplying the adjusted transaction value by a second parameter. The third-party loyalty program computer system then determines whether the required loyalty points for a potential rewards offer value exceeds the current rewards balance amount. If the required loyalty points for a potential rewards offer value is less than the current rewards balance, the third-party loyalty program computer system calculates a final rewards offer value by dividing the required loyalty points for a potential rewards offer value by a third parameter and subtracts the required loyalty points for a potential rewards offer value from the current rewards balance. Continuing with the above example, using an obfuscated purchase transaction of $35.00, a first parameter of 1000, a second parameter of 10, and a third parameter of 700 would yield a final rewards offer value of $5.00. (e.g. ((($35.00×1000=35,000)×10%=3,500))*(1/700)=$5.00))).

It is thus an advantage of the current method to implement a third parameter that can be used to reward users generously to encourage point redemption. Using this formula, the lower the third parameter, the more generous the offer is. For example, a third parameter of 500 in the above example would yield a final rewards offer of $7.00 for the same required loyalty points of 3,500.

In at least one embodiment, the subtraction is only temporary unless the user ends up accepting the rewards offer for redemption—otherwise, the current balance will return to its original balance. This embodiment can be implemented as described in FIGS. 7A and 7B in relation to the point balance request function 724.

The second parameter may comprise the same value for each client or the second parameter may be unique for each client. For example, a first client may allow for offers to be made up to 10% of the obfuscated transaction value while a second client may allow for offers to be made up to 5% of the obfuscated transaction value. Similarly, the third parameter may comprise the same value for each client or the third parameter may be unique for each client. For example, a first client may set the third parameter at 700, while a second client may set the third parameter at 500. Thus, the first parameter, second parameter and third parameter taken together can reflect a preconfigured formula of purchase amounts to reward offer values. Depending on the second and third parameter values, the finalized reward offer value may match the total first obfuscation value or the finalized reward offer value may be less than the first obfuscation value. Once calculated using the second and third parameters, the third-party loyalty program computer system communicates to the intermediary payment network computer system the required loyalty points for a potential rewards offer value and the finalized rewards offer value, which is then communicated to the user device for possible redemption.

However, as an alternative method for security purposes, the third-party loyalty program computer system can map the required loyalty points for a potential rewards offer value to a rewards obfuscation value within a rewards obfuscation dataset. The rewards obfuscation value is associated with an upper threshold of the rewards balance that is less than the adjusted transaction value. As used herein, the "rewards obfuscation dataset" comprises at least the rewards obfuscation value and at least a second rewards obfuscation value, both the rewards obfuscation value and the second rewards obfuscation value being associated with different non-overlapping ranges for potential adjusted rewards values.

Similar to the first obfuscation dataset described above, the rewards obfuscation dataset provides valuable privacy and security considerations to the end user. For example, there may be significant data mining value in acquiring the exact current rewards balance associated with the user. For similar reasons described above, a data mining company may be able to correlate specific values with specific behaviors and attributes of the user. As such, the rewards obfuscation dataset provides a technical solution to this problem by obfuscating the actual current rewards balance associated with the user. For example, the user's rewards balance may comprise 23,566 rewards points. However, the required loyalty points for a potential rewards offer value may equate to 15,277 points. Since this the required loyalty points for a potential rewards offer number is less than the current rewards balance, the third-party loyalty program computer system can determine a specific amount of rewards points to offer for redemption. To determine that amount, the third-party loyalty program computer system maps the 15,277 the required loyalty points for a potential rewards offer value to the rewards obfuscation dataset which may comprise entries of 500, 1000, 5000, 10000, 20000, and 50000. As such the third-party loyalty program computer system maps the 15,277 adjusted transaction value to the 10,000 rewards obfuscation value. By using this rewards obfuscated value, the third-party loyalty program computer system prevents any later party, including the intermediary payment network computer system from determining the exact current rewards point balance associated with the user.

The third-party loyalty program computer system then determines a finalized awards amount by dividing the rewards obfuscation value by the third parameter Using the current example of 10,000 rewards points and a third parameter of 600 would yield an offer of $16.67 (e.g. ((10,000* (1/600)). Similar to the method described above, this method determines the actual monetary value offered to the user for possible redemption. The third-party loyalty program computer system can then communicate the rewards obfuscation value and the actual monetary value to a user device. In at least one embodiment, this communication occurs through the intermediary payment network computer system. This embodiment can be implemented as described in FIGS. 7A and 7B in relation to the Present Offer Function 716.

Turning now to the user device, the user device comprises a third processor and a third computer-readable media having stored thereon executable instructions that when executed by the third processor configure the user device to perform steps for protecting the user's privacy. In response to the above, the user device displays, on a user interface at the user device, a notification to accept the rewards obfuscation value as a digital financial payment award. As such, the user is provided with an opportunity to redeem a portion of the user's rewards points for a monetary reduction in the amount of money the user pays during the transaction. The process of reducing the transaction amount and of processing the digital monetary amount is discussed in great detail below.

Accordingly, in at least one embodiment, the system is able to maintain security and privacy by performing specific functions on separate, remote systems that prevents unnecessary identifiable data from being communicated.

In embodiments of the present invention as illustrated in FIG. 1, Platform Architecture is comprised of five components. Input Device 101 (also referred to herein as "merchant device") is operable to initiate a data transfer operation to send data to the Platform 102 (also referred to herein as an "intermediary payment network computer system" and/or a "third-party loyalty program computer system"). Input Device 101 may be a point-of-sale POS device or a user interface deployed to a web browser or a mobile user device. Input Device 101 may otherwise be an API or other message format. Input Device 101 is connected to Platform 102 through a secure link such as https and may be further controlled with additional components such as a firewall or load balancer. The Input Device 101 may be implemented as described in FIGS. 7A and 7B to transmit Purchase Transaction Data 708 via Network Layer 706.

Platform 102 is operable to receive data and messages from Input Device 101. Platform 102 is comprised of computer programs which may be developed in modern programing languages such as node.js, react.js, php, and other suitable languages. Platform 102 is deployed onto computing devices which may be comprised of one or more physical servers, virtual machines, or various serverless environments such as AWS Fargate containers or as Lamdba functions. The Platform 102 is operable to read and persist data onto Storage 103 using a secure link. Storage 103 may be implemented as a relational database such as SQL, AWS Dynamo, or other suitable computing storage technology. The Platform 102 is operable to read and persist data onto First List 104, Second List 105, and Third List 106 using secure links. First List 104, Second List 105, and Third List 106 may be implemented as a relational database such as SQL, AWS Dynamo or other suitable computing storage technology. The Platform 102 may be implemented as described in FIGS. 7A and 7B, Core Platform 704, Integration Layer 714, and Point Bank 722.

The First List 104 may be comprised of predetermined values in a single column format, wherein each item in the list is considered a unique row of the First List 104. The Second List 105 is comprised of predetermined values in a dual column format, wherein each pair of items in the list is considered a unique row of the Second List 105. The Third List 106 is comprised of predetermined values in a single column format, wherein each item in the list is considered a unique row of the Third List 106. Although other internal components of the computing devices are not shown, those of ordinary skill in the art will appreciate that such components and the interconnection between them are well known. Accordingly, additional details concerning the internal construction of the computing devices need not be disclosed in connection with the present invention.

Figure 2:
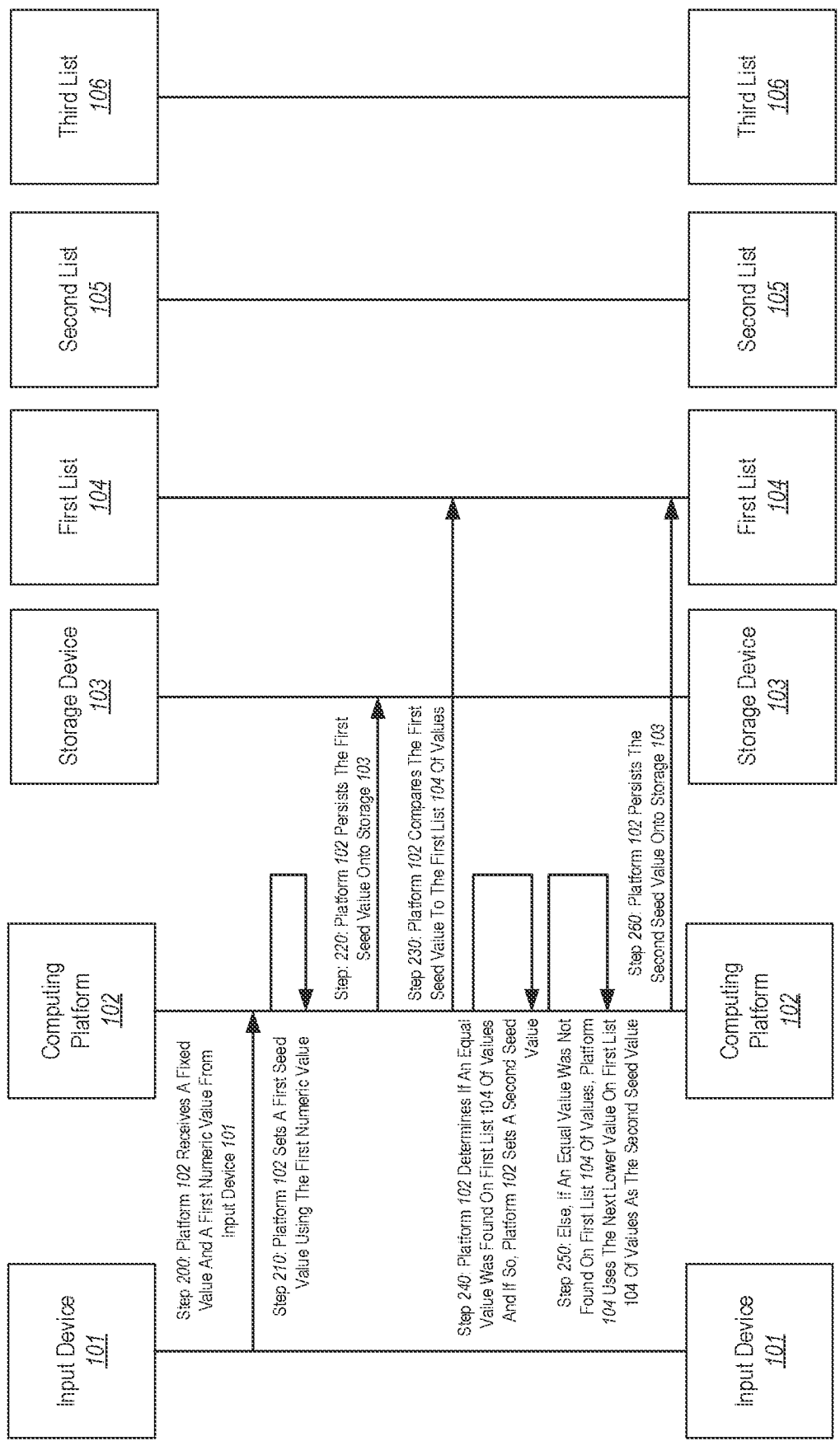
FIG. 2 illustrates an exemplary end-to-end flow for using lists implemented as tiers as a basis for determining a final value based on a random value.

FIG. 2 illustrates an exemplary end-to-end flow for using lists implemented as tiers as a basis for determining a final point value based on a random numeric value. An embodiment of the present invention as illustrated in FIG. 2 is comprised of the following elements: Input Device 101, Platform 102, Storage 103, First List 104, Second List 105, and Third List 106. FIG. 2 depicts various steps that are described below:

- Step 200: Platform 102 receives a fixed value and a first numeric value from Input Device 101. As used herein the "fixed value" refers or is defined as an identifier number, such as an account or card number. As used herein, the first "numeric value" comprises a transaction value, such as the monetary amount of money being spent in this transaction.
- Step 210: Platform 102 sets a first seed value using the first numeric value. As used herein, the "first seed value" comprises the first numeric value.
- Step 220: Platform 102 persists the first seed value onto Storage 103.
- Step 230: Platform 102 compares the first seed value to the First List 104 of values.
- Step 240: Platform 102 determines if an equal value was found on First List 104 of values and if so, Platform 102 sets a second seed value as the amount equal to the first seed value.
- Step 250: Else, if an equal value was not found on First List 104 of values, Platform 104 uses the next lower value on First List 104 of values as the second seed value. For clarity, it should be appreciated that the second seed value as determined in either Step 240 or Step 250 is an implementation of the "first obfuscation value" as previously referenced herein.
- Step 260: Platform 102 persists the second seed value onto Storage 103.

Figure 3:
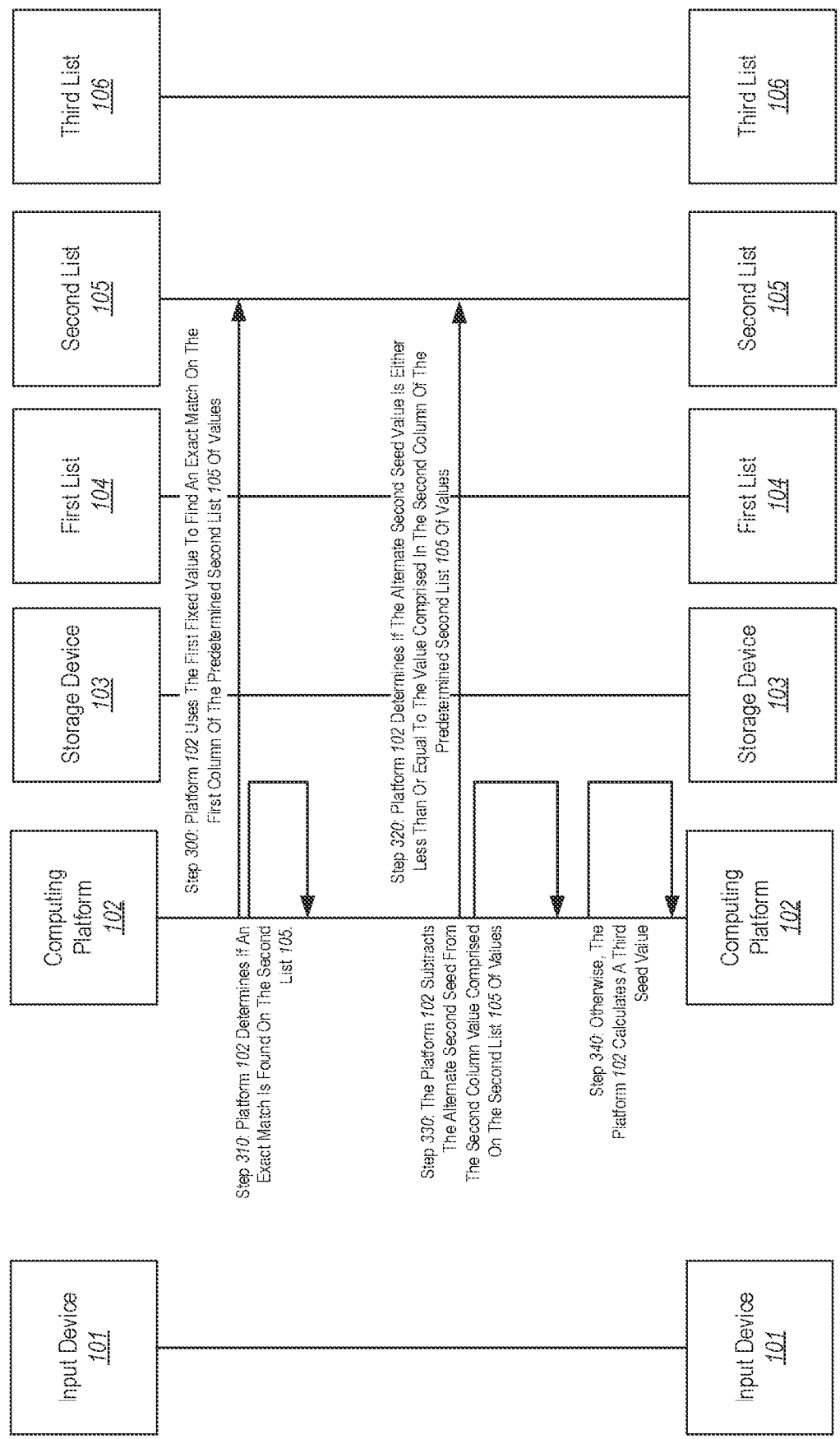
FIG. 3 illustrates a continuation of an exemplary end-to-end flow for using lists implemented as tiers as a basis for determining a final value based on a random value.

FIG. 3 illustrates a continuation of an exemplary end-to-end flow for using lists implemented as tiers as a basis for determining a final point value based on a numeric value. An embodiment of the present invention as illustrated in FIG. 3 comprises the following elements: Input Device 101, Platform 102, Storage 103, First List 104, Second List 105, and Third List 106. FIG. 3 depicts various steps that are described below:

- Step 300: Platform 102 uses the first fixed value to find an exact match on the first column of the predetermined Second List 105 of values;
- For clarity, it should be appreciated that the Second List 105 of values represents an implementation of the "rewards balance dataset" as previously described herein.
- Step 310: Platform 102 determines if an exact match is found on the second list 105. If an exact match is found on the Second List 105, Platform 102 calculates an alternate second seed value using a first parameter and a second parameter.
- For clarity, it should be appreciated that the alternate second seed value represents an implementation of the "the required loyalty points for a potential rewards offer" as previously described herein which can be achieved by multiplying the adjusted transaction value by a first and second parameter. For example using the method previously described herein, an exemplary purchase transaction of $37.23 (as the first seed value) can be obfuscated to $35.00 (as the second seed value) using the First List 104 of Values. The obfuscated purchase amount (i.e., the second seed value) can be multiplied by the first parameter of 1000 percent and again the second parameter of 10% to determine the required loyalty points for a potential rewards offer amount of 3,500 points as the alternate second seed value.
- Step 320: Platform 102 determines if the alternate second seed value is either less than or equal to the value comprised in the second column of the predetermined Second List 105 of values.
- For clarity, it should be appreciated that the second column of the Second List 105 of values comprises the current loyalty point balance associated with the first fixed value.
- Step 330: If the alternate second seed value (e.g. required loyalty points) is less than or equal to the value comprised in the second column (current loyalty point balance) of the predetermined Second List 105 of values, the Platform 102 subtracts the alternate second seed from the second column value comprised on the Second List 105 of values and Platform 102 sets the final point value as equal to the alternate second seed value;

And,

- Step 340: Otherwise, as an alternative for security reasons, the Platform 102 sets a third seed value using the alternate second seed value (required loyalty points). The third seed value will be used as input to the Third List 106. Of Values as further described herein.

Figure 4:
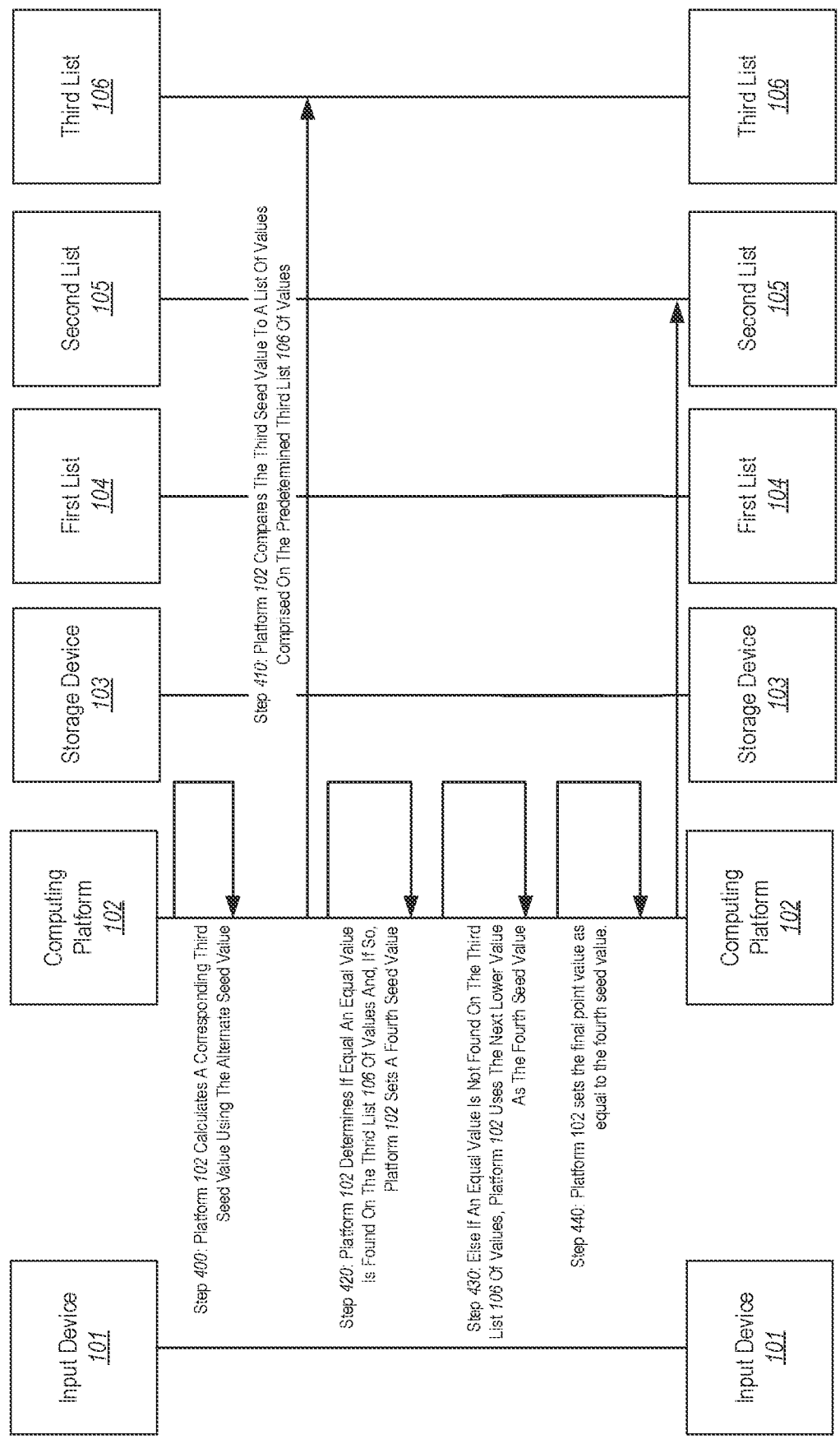
FIG. 4 illustrates a continuation of an exemplary end-to-end flow for using lists implemented as tiers as a basis for determining a final value based on a random value.

FIG. 4 illustrates a continuation of an exemplary end-to-end flow for using lists implemented as tiers as a basis for determining a final point value based on a random value. An embodiment of the present invention as illustrated in FIG. 4 is comprised of the following elements: Input Device 101, Platform 102, Storage 103, First List 104, Second List 105, and Third List 106. FIG. 4 depicts various steps that are described below:

- Step 400: Platform 102 sets a corresponding third seed value using the alternate second seed value as previously described herein.
- Step 410: Platform 102 compares the third seed value to a list of values comprised on the predetermined Third List 106 of values;
- For clarity, it should be appreciated that the Third List 106 Of Values as used here is an implementation of the obfuscation dataset as previously described in order to determine a specific amount of rewards points to offer for redemption.
- Step 420: Platform 102 determines if an equal value is found on the predetermined Third List 106 of values and, if so, Platform 102 sets a fourth seed value;
- For clarity, it should be appreciated that the fourth seed value is an implementation of the rewards obfuscation value previously described herein.
- Step 430: Else, if an equal value is not found on the Third List 106 of values, Platform 102 uses the next lower value as the fourth seed value;
- Step 440: Platform 102 sets the final point value as equal to the fourth seed value.

Figure 5A:
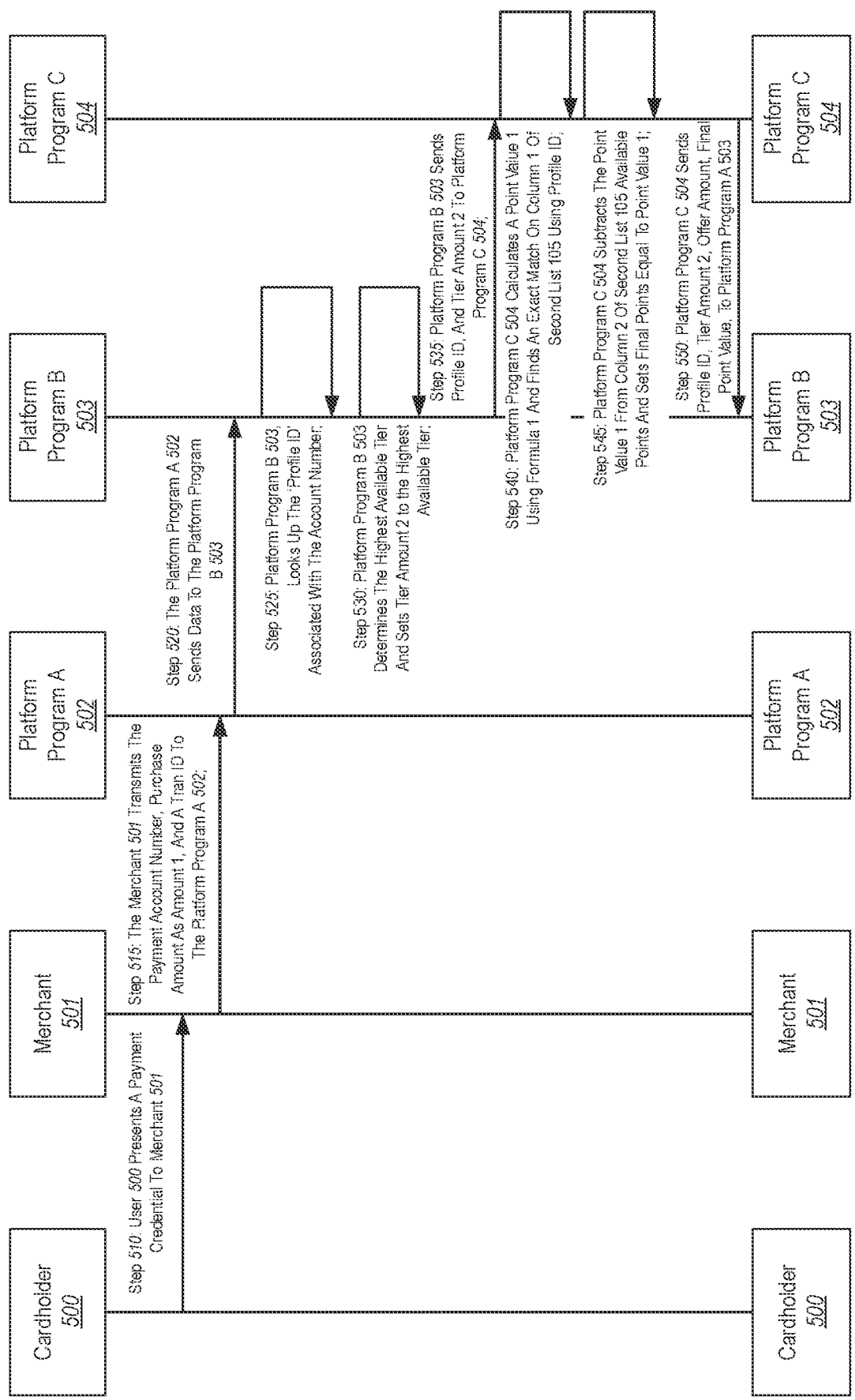
FIG. 5A illustrates an exemplary end-to-end flow using the method for a loyalty point redemption use case.

FIG. 5A illustrates an exemplary end-to-end flow using the method for a loyalty point redemption use case. Embodiments of the present invention as illustrated in FIG. 5A are comprised of the following steps:

Step 510: User 500 (also referred to as "cardholder 500") presents a payment credential to Merchant 501;

Step 515: the Merchant 501 transmits the payment account number, purchase amount as Amount 1, and a Tran ID to the Platform Program A 502;

Step 520: The Platform Program A 502 invokes the 'Transaction Create Webhook' to send data the Platform Program B 503;

Step 525: Platform Program B 503 handles the Webhook data and using account number, looks up the 'Profile ID' associated with the account number;

Step 530: Platform Program B 503 using First List 104 using the predetermined values in increments of $5 starting with a high tier value of $300 and ending with a low tier value of $5, determines the highest available tier and sets Tier Amount 2 in an amount equal to the highest available tier value; As described here, the Tier Amount 2 is an implementation of the Obfuscated Transaction Amount previously described herein;

Step 535: Platform Program B 503 sends Profile ID, and Tier Amount 2 to Platform Program C 504;

Step 540: Platform Program C 504 calculates a required Point Value 1 using Formula 1 and finds an exact match on column 1 of Second List 105 using Profile ID; "Formula 1" as referenced is an implementation of the mathematical product of the first parameter and second parameter as previously described herein. For example, for a given Tier Amount 2 equal to $70.00, a first parameter equal to 1000 and a second parameter equal to 10 would yield a required Point Value 1 of 7,000.

Step 545: If sufficient points are available in column 2 of Second List 105 for Profile ID, Platform Program C 504 subtracts the Point Value 1 from column 2 of the Second List 105 available points and sets Final Points equal to Point Value 1; Step 545 is also operable to calculate an offer amount based on the third parameter as previously described herein; and, Step 550: Platform Program C 504 sends Profile ID, Tier Amount 2, Offer Amount, Final Point Value, to Platform Program A 503.

Figure 5B:
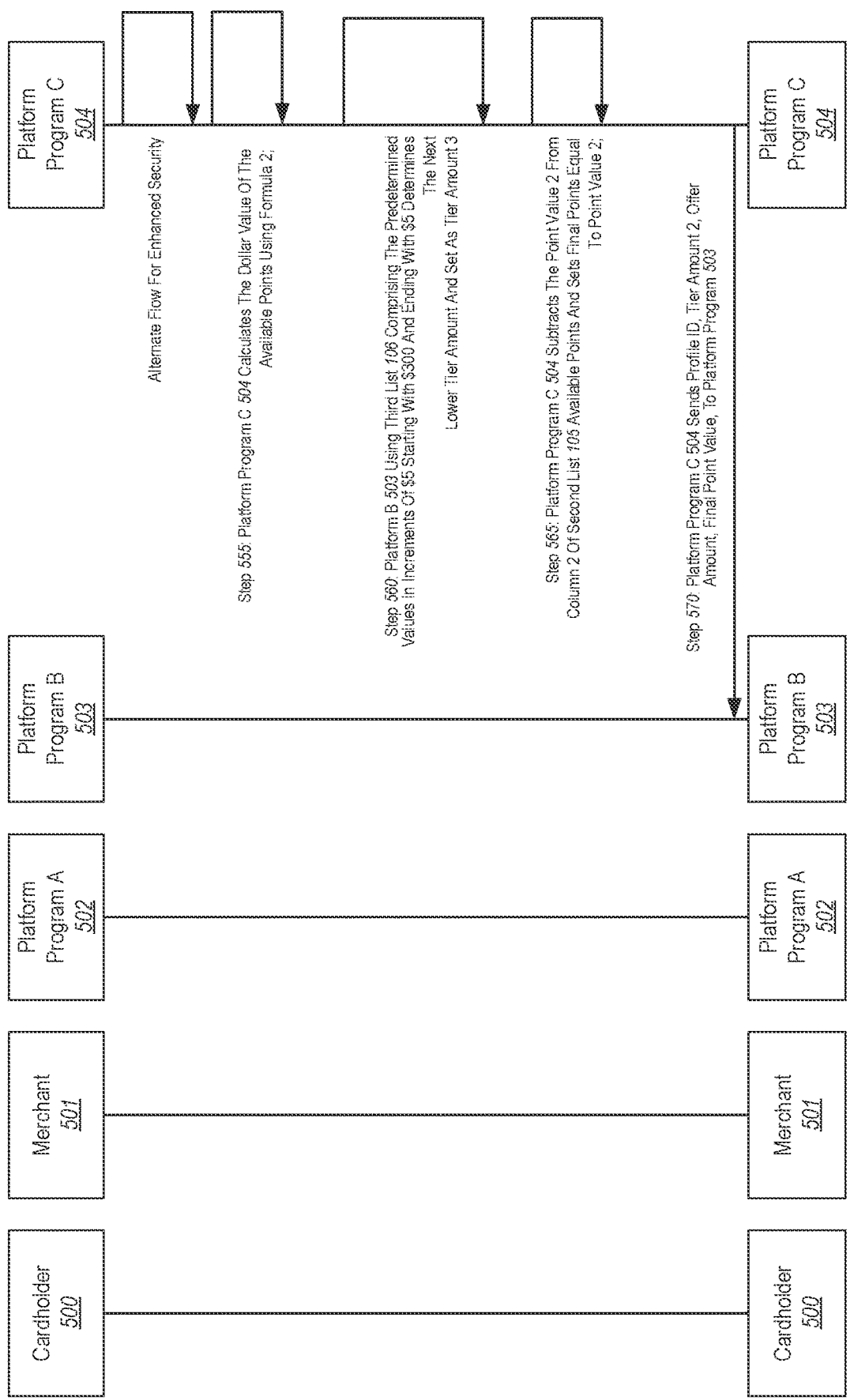
FIG. 5B illustrates an exemplary end-to-end flow using the method for a loyalty point redemption use case.

FIG. 5B illustrates an exemplary end-to-end flow using the method for a loyalty point redemption use case. Embodiments of the present invention as illustrated in FIG. 5B are comprised of the following steps for additional security reasons:

Step 555: Platform Program C 504 calculates the dollar value of the available points using Formula 2; Formula 2 is an implementation of the mathematical quotient of Point Value 1 from column 2 the Second List 105 available points divided by the first parameter. Continuing with the previous example, if the Point Value 1 for a given user is equal to 6,000 points, using the Formula 2 would yield a dollar value of the available points equal to $6. (e.g. ((3,000*(1/1000)))).

Step 560: Platform Program B 503 using Third List 106 comprising the predetermined values in increments of $5 starting with a high tier of $300 and ending with a low tier of $5 determines the next lower tier amount and sets as Tier Amount 3; Using the above example, the resulting quotient value of $6 would resolve to the lowest tier increment of $5. At this point in the process, Platform Program C would recalculate the points required to redeem a $5 offer based on the third parameter as previously described herein and accordingly set the Point Value 2.

Step 565: Platform Program C 504 subtracts the Point Value 2 from column 2 of Second List 105 available points and sets Final Points equal to Point Value 2; and Step 570 Platform Program C 504 sends Profile ID, Tier Amount 2, Offer Amount, Final Point Value, to Platform Program B [503].

It should be appreciated that the method described above in Step 560 can be used for security purposes in circumstances when sufficient points are available as reflected in column 2 of Second List 105 for Profile ID.

It should be appreciated that Computing Platform 102 may be implemented as several interoperable computing systems. For example, the Computing Platform 102 can be implemented as Platform Program A 502, Platform Program B 503, and Platform Program C 504. It should also be appreciated that the steps performed by Platform Program C 504 can be implemented at a third-party loyalty provider implemented as an Issuer Point Bank.

Figure 6:
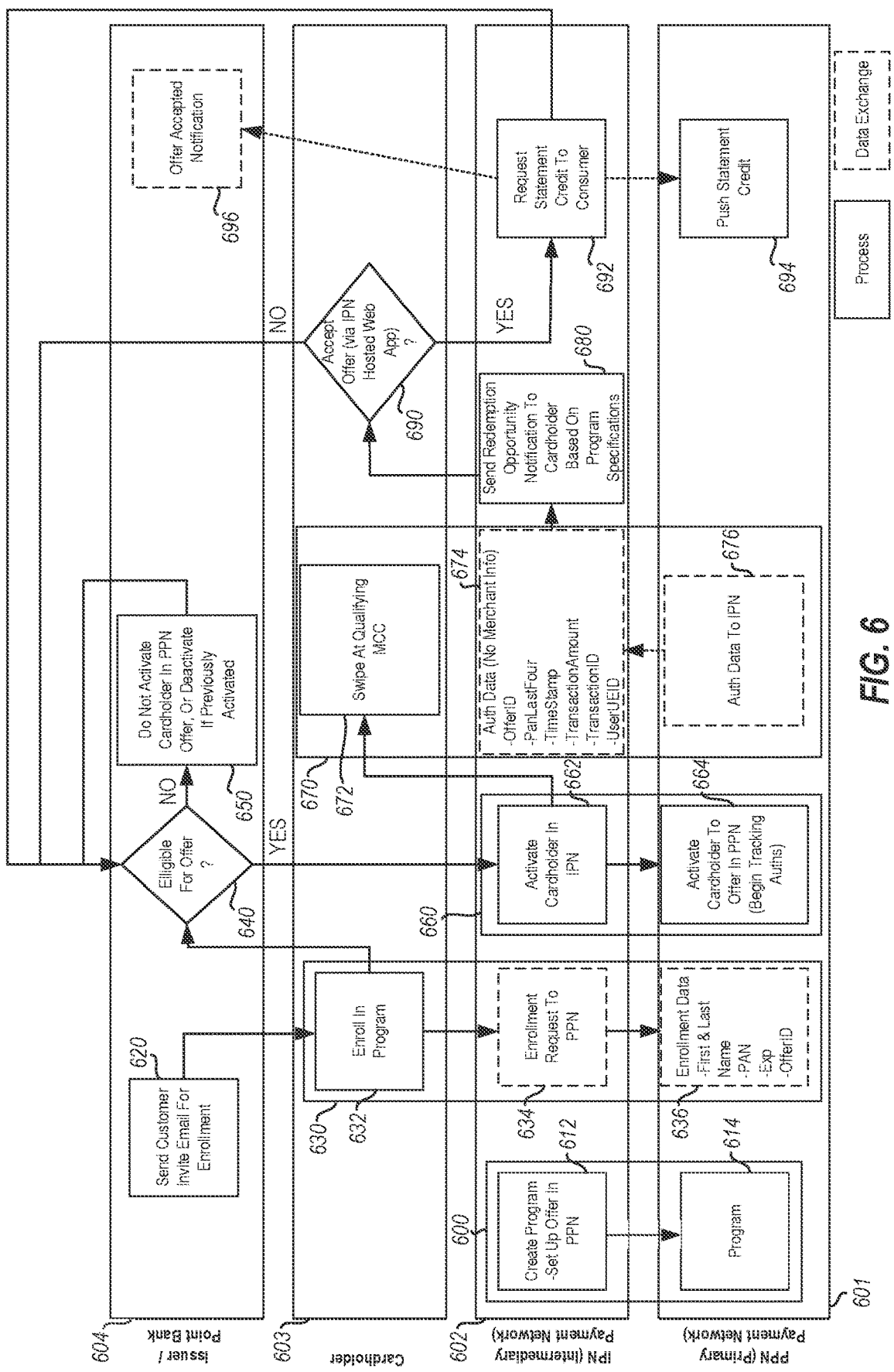
FIG. 6 illustrates a flowchart of a use case involving loyalty points using the system for numeric translation.

FIG. 6 further describes embodiments and aspects of the data and process flow within a numeric translation system. In this description, the Primary Payment Network 601 corresponds to FIG. 7A Network Layer 706 and the Intermediate Payment Network 602 corresponds to FIG. 7A Core Platform 704 and FIG. 7A Integration Layer 714. Cardholder 603 corresponds to FIG. 7A, Customer 500. Issuer/Point Bank 604 corresponds to FIG. 7B Point Bank 724. The following exemplary steps can be implemented:

Step 600: An offers program is created using Step 612 using the Intermediary Payment Network Computing Platform 602. The offers program is transmitted to the Primary Payment Network Platform 601 where it is implemented as Program 614 to monitor transactions for participating customers.

Step 620: A customer (i.e., cardholder 603) is notified by the third-party loyalty provider of the offers program via email or within the third-party loyalty provider website.

Step 630: The customer enrolls using Step 632 in Program 614 via the third-party loyalty provider website web page. Enrollment Data 636 is passed to the Intermediate Payment Network 602 using Step 634. Enrollment Data 636 is comprised of at least a customer payment account number, expiration date, first name, last name, and email address. Intermediate Payment Network 602 transmits Enrollment Data 636 to Primary Payment Network 601. The Primary Payment Network 601 enrolls the customer within the Offers Program 636.

Step 640: The Intermediate Payment Network 602 checks to determine whether the customer is eligible for a point-redemption offer. Eligibility is based on both whether the customer has sufficient points as well as whether the customer has received or redeemed prior point redemption offers within a certain period of time (e.g., days, weeks, or months).

Step 650: If the customer is not deemed eligible, their enrollment is either not activated or if already active the enrollment is deactivated in the Intermediate Payment Network 602.

Step 660: If the customer is deemed eligible, their enrollment is activated using Step 662 within the Intermediate Payment Network 602 computing platform and using Step 664 within the Primary Payment Network 601 computing platform.

Step 670: The next time the activated customer makes a purchase at a merchant from a qualifying 'Merchant Category Code' MCC using Step 672, the Primary Payment Network 601 sends Auth Data 676 to the Intermediary Payment Network 602 where it is stored as Auth Data 674 with limited ("obfuscated") purchase transaction data (e.g., date/time and amount along with other data that might include one or more of the Offer ID corresponding to Program 614, the User EUID, the Transaction ID, and the last four digits of the payment account number (PAN)). It should be appreciated that a qualifying merchant may also be identified using a specific Merchant Identification Code (MID) or codes.

Step 680: Responsive to the receipt of the auth data, the Intermediary Payment Network 602 sends a point redemption opportunity notification to the customer via SMS and email.

Step 690: The customer accepts or declines the offer.

Step 692: If the customer accepts the offer and redeems loyalty points toward their qualifying purchase the Intermediary Payment Network 602 requests a statement credit using Step 692 to be sent back to the customer's account via the Primary Payment Network 601 using Step 694 and notifies the third-party loyalty provider using Notification 696 that the customer has accepted the offer.

Step 696: If the customer declines the offer, the process returns to Step 640 wherein the Intermediary Payment Network 602 periodically rechecks the customer's eligibility for point redemption offers and determines whether or not to reactivate the customer within the Intermediary Payment Network 602 to receive purchase transaction data for qualifying transactions. If the customer is not eligible, the system will continue to periodically check for eligibility until the customer is eligible again before re-activating with the Primary Payment Network 601.

Figure 7A:
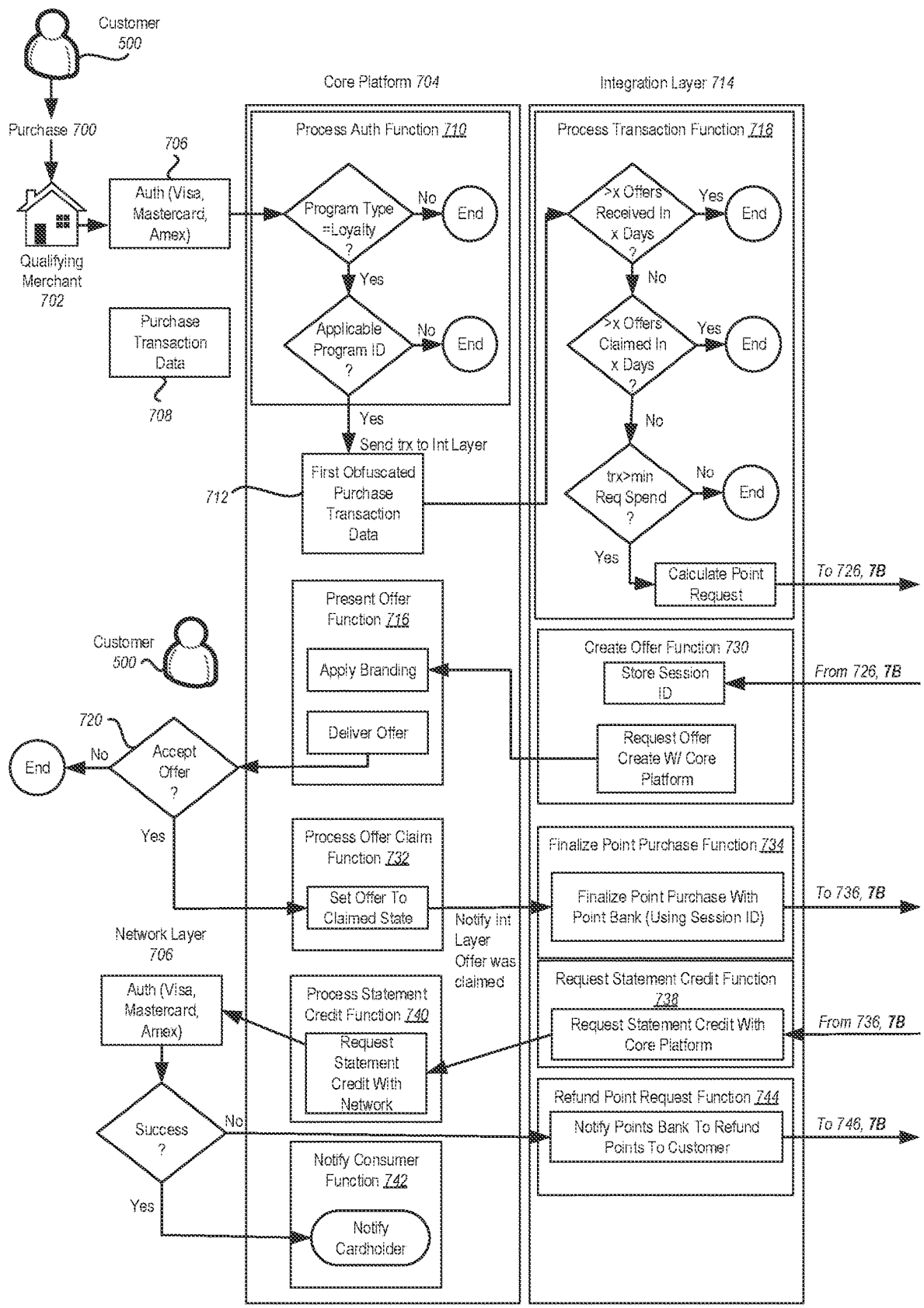
FIGS. 7A and 7B illustrates an end-to-end flow diagram of an implementation using the system for numeric translation.
Figure 7B:
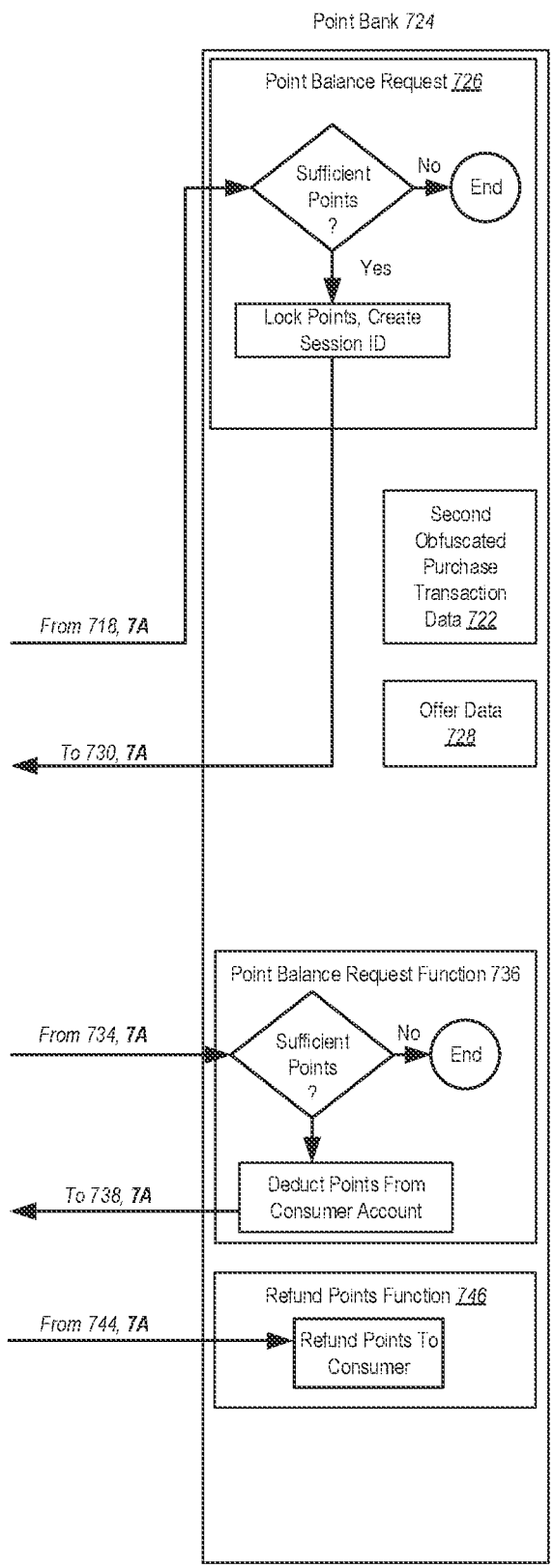

FIGS. 7A and 7B illustrates an end-to-end flow diagram of an implementation using the method and system described herein. The resulting process will request a reward for the highest available disbursement amount for a given purchase transaction.

Continuing with the description of FIGS. 7A and 7B, Customer 500 uses a credit card to make a purchase 700 at Qualifying Merchant 702. Purchase transaction data comprised of at least a credit card number, an amount, and a merchant ID is transmitted from the Qualifying Merchant 702 to the Network Layer 706. It should be appreciated that the Network Layer 706 may be implemented as a single or multiple payment networks. The Network Layer 706 forwards the Purchase Transaction Data 708 to the Core Platform 704. The Core Platform 704 receives the Purchase Transaction Data 708 in Process Auth Function 710. It should be appreciated that Purchase Transaction Data 708 is an implementation of FIG. 6, Auth Data 676. Upon receipt of the Purchase Transaction Data 708, the Process Auth Function 710 determines if the purchase transaction is one of a loyalty transaction type. This determination is made using the elements of the Purchase Transaction Data 708 to determine that the issuing bank has participated in the loyalty offer program, that credit card number has been registered to receive loyalty offers, and that the merchant is of a qualified type.

If the Purchase Transaction is one of a loyalty transaction type, the Process Auth Function 710 is operable to determine if there is an applicable Program Id associated with the Purchase Transaction Data 708. Program Id as used herein refers to the unique identifier of the card issuing bank of the credit card used by Customer 500 to make the purchase 700. If there is an applicable Program Id associated with the Purchase Transaction Data 708, the Purchase Transaction Data 708 is obfuscated a first time as previously described in FIGS. 1-6 herein. The First Obfuscated Purchase Transaction Data 712 is transmitted to the Integration Layer 714.

Continuing with the description of Integration Layer 714, Process Transaction Function 718 determines in accordance with a first throttling criteria for the Program Id associated with the credit card used to make the purchase, if the Customer 500 has already been presented a loyalty offer or offers within a specified period of time (and as further described herein using Present Offer Function 716). For example, as a first exemplary configuration of the first throttling criteria a first issuing bank may limit the total number of offers that an enrollee may receive such that the total may not exceed 1 offer within a 7-day timeframe, while a second exemplary configuration of the first throttling criteria for a second issuing bank may limit the total number of offers that an enrollee may receive such that the total may not exceed 2 offers within a 10-day timeframe. Other configurations of the first throttling criteria may be implemented for participating banks as required in accordance with an issuing bank policy. The configuration of the first throttling criteria for the bank associated with the credit card used by Customer 500 to complete Purchase 700 is determined by the Process Transaction Function 718 using the unique Program Id for the issuing bank as determined by Process Auth function 710 derived from the credit card number comprised within the First Obfuscated Purchase Transaction Data 712.

If a loyalty offer is currently allowable based on the configuration of the first throttling criteria for the credit card used by Customer 500, the Process Transaction Function 718 can determine in accordance with a second throttling criteria for the Program Id associated with the credit card used to make Purchase 700, if the Customer 500 has already accepted an offer or offers within a specified period of time (as further described herein using Accept Offer 720). For example, as a first exemplary configuration of the second throttling criteria a first issuing bank may limit the total number of loyalty offers that an enrollee may accept to not exceed 1 offer within a 14-day timeframe, while a second exemplary configuration of the second throttling criteria for a second issuing bank may limit the total number of offers that an enrollee may receive to not exceed 2 offers within a 28-day timeframe. Other configurations of the second throttling criteria may be implemented as required in accordance with an issuing bank policy. The second throttling criteria configuration for the bank associated with the credit card used by Customer 500 to complete Purchase 700 is determined by the Process Transaction Function 718 using the unique Program Id for the issuing bank as determined by Process Auth, Function 710 derived from the credit card number comprised within the First Obfuscated Purchase Transaction Data 712.

If a loyalty offer is currently allowable based on the configuration of the second throttling criteria for the credit card used by Customer 500, the Process Transaction Function 718 can determine in accordance with a third throttling criteria for the Program Id associated with the credit card, if the data comprised within the First Obfuscated Purchase Transaction Data 712 complies with the configuration of a third throttling criteria. For example, as a first exemplary configuration of the third throttling criteria, a first issuing bank may limit the first obfuscated purchase transaction amount to a minimum amount of $10, while a second exemplary configuration of the third throttling criteria for a second issuing bank may limit the first obfuscated purchase transaction amount to a maximum amount of $100. Other configurations of the third throttling criteria may be implemented as required in accordance with an issuing bank policy. The third throttling criteria configuration for the bank associated with the credit card used by Customer 500 to complete Purchase 700 is determined by the Process Transaction Function 718 using the unique Program Id for the issuing bank as determined by the Process Auth Function 710 derived from the credit card number comprised within the First Obfuscated Purchase Transaction Data 712. If an offer is currently allowable based on the configuration of the third throttling criteria for the credit card used by Customer 500, the Process Transaction Function 718 can initiate a Calculate Point Request associated with the First Obfuscated Purchase Transaction Data 712. A Second Obfuscated Purchase Transaction Data 722 is then transmitted to the Point Bank 724. (see equivalent FIG. 6, Step 680) The Second Obfuscated Purchase Transaction Data 722 includes at least a unique Reference ID replacing the credit card used by the Customer 500 and an obfuscated purchase amount.

Upon receipt of the Second Obfuscated Purchase Data 722, the Point Balance Request Function 726 can determine if a sufficient point balance is available to complete a loyalty offer. The determination as to whether there is a sufficient point balance can be based on calculations using formulas comprised within the Point Bank 724 computing system. The calculations used by Point Bank 724 can vary between issuing banks as implemented by the Point Bank 724 and in accordance with bank policy and as previously described in FIGS. 1-6. For example, a first issuing bank may equate each dollar of the Second Obfuscated Purchase Transaction Data 722 to 1000 loyalty points, while a second issuing bank may equate each dollar of the Second Obfuscated Purchase Transaction Data 722 to 2,000 loyalty points. Other calculations may be implemented as required in accordance with an issuing bank policy.

If it is determined that there is a sufficient point balance to complete a loyalty offer, Point Bank 724 determines an offer amount based on the Second Obfuscated Purchase Transaction Data 722. The calculation used to determine the offer amount can be configured in accordance with a bank policy. For example, a first exemplary issuing bank can allow offers to be made for 10% of the obfuscated purchase amount comprised within the Second Obfuscated Purchase Transaction Data 722 while a second exemplary issuing bank can allow offers to be made for 5% of the obfuscated purchase amount comprised within the Second Obfuscated Purchase Transaction Data 722. In other preferred implementations, a database table comprised within the Point Bank 724 can be comprised with tiers that can determine the loyalty offer amount based on the obfuscated purchase amount comprised within the Second Obfuscated Purchase Transaction Data 722 as described herein.

Summarizing here for additional clarity, using Point Balance Request Function 726, an exemplary third issuing bank can equate each dollar of the of the obfuscated purchase amount comprised within the Second Obfuscated Purchase Transaction Data 722 to 1000 points and allow a 10% offer to be rendered on a $100 of the obfuscated purchase amount comprised within the Second Obfuscated Purchase Transaction Data 722. The resulting exemplary implementation of Point Balance Request Function 726 would render an offer amount of $10 while locking 10,000 points.

Using this method, if it is determined that a sufficient loyalty point balance is available for the Reference ID related to the credit card used by Customer 500, the Point Balance Request Function 726 can temporarily lock a calculated number of loyalty points needed in order to hold the points for enough time to present an offer to Customer 500. While the loyalty points are locked, they are deducted from the available points that can be used for other purposes. The amount of time that this temporary lock can be in effect can vary between issuing banks. A first exemplary issuing bank may specify to the Point Bank 724 that the point lock timeframe should be configured to 72 hours whereas a second exemplary issuing bank may specify that the point lock timeframe should be configured to 12 hours. After the loyalty points have been locked in accordance with the configuration, the Point Balance Request Function 726 can transmit Offer Data 728 needed to create an offer. Offer Data 728 may include at least a session ID, the Reference ID, the Offer Amount, and the loyalty points required.

Offer Data 728 is received by Create Offer Function 730. The Create Offer Function 730 stores the session ID (provided within the Offer Data 728) in association with the Reference ID, Offer Amount, loyalty points required and the timeframe associated with the point lock. The Create Offer Function 730 submits a request to create an offer to the Core Platform 704. The request comprises information from the Offer Data 728 as described herein.

Core Platform 704 receives the offer data and prepares the offer for presentation in accordance with branding requirements of the issuing bank using the Present Offer Function 716. Branding data can vary according to issuing bank specification which can include elements such as font, color, and logo. These branding elements are stored on the Core Platform 704 in association with the issuing bank Program ID. After the branding step is completed Present Offer Function 716 can be transmitted to Customer 500. The resulting offer can include at a minimum the original purchase transaction amount comprised in the Purchase Transaction Data 708, the last four digits of the credit card number used by Customer 500, the name of the Qualifying Merchant 702, the Offer Amount, the number of loyalty points required, and the timeframe associated with the point lock.

Customer 500 may reject the offer. For rejected offers, the point lock will naturally expire and the loyalty points will be made available for future use by the Customer 500. Alternatively, Customer 500 may accept the offer. Upon acceptance of offer by Customer 500 an offer accepted message is transmitted to the Core Platform 704. It should be appreciated that the offer can be transmitted to Customer 500 using a variety of communication methods and protocols. For example, the offer may be communicated by an email, text message, or push message sent to a user computing device associated with Customer 500. The user computing device may be a smart phone, personal computing device, smart TV or other user computing device operable to receive the communication.

Upon receipt of indication that the offer has been accepted, the Process Offer Claim Function 732 can set the status of the offer to a claimed state. A message is transmitted to the Integration Layer 714 with an indication that the offer has been claimed. Upon receipt by the Integration Layer 714, Finalize Point Purchase Function 734 is operable to finalize the point purchase with Point Bank 724 using the session ID stored in association with Offer Data 728. The session ID is transmitted to the Point Bank 724 with a request to finalize the loyalty point transaction.

The Point Balance Request Function 736 uses the session ID to locate the locked points of the loyalty point account associated with the credit card of Customer 500 used to make Purchase 700. A final check is completed to confirm that the loyalty point account associated with the credit card of Customer 500 has sufficient points to complete the transaction. If there are sufficient points, the locked points are deducted from the loyalty account balance and a confirmation message is transmitted to the Integration Layer 714. The confirmation message can include at least the session ID associated with the Offer Data 728. It should be appreciated that other data elements can be included in this communication or any of the communications described herein in order to achieve the desired outcome of the method.

The Request Statement Credit function 738 is operable to request a statement credit to be applied to the credit card of Customer 500. (see related FIG. 6, Step 692) A message is transmitted to the Core Platform 704 with at least the Reference ID and Offer Amount comprised within Offer Data 728. Using the Reference ID, the Process Statement Credit function 740 can determine the credit card number that was used in Purchase 700 and comprised within Purchase Transaction Data 708 prior to the first obfuscation. Using the credit card number, a statement credit request is transmitted to Network Layer 706.

Upon receipt of the communication, the Notify Consumer function 742 can send a notification to Customer 500 with an indication that the statement credit has been applied. It should be appreciated that the communication message can be transmitted to Customer 500 using a variety of communication methods and protocols. For example, the communication message may be sent via an email, text message, or push message sent to a user computing device associated with Customer 500. The user computing device may be a smart phone, personal computing device, smart TV or other user computing device operable to receive the communication. The user device that receives the communication, may be the same device that received the original offer message or a different device associated with Customer 500.

In the event that the statement credit was not successful, error correction logic is operable to return the loyalty points to the appropriate loyalty point account. This process is completed with Refund Points Request function 744 and Refund Points Function 746.

The methods described herein may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for numeric translation, comprising:
an intermediary payment network computer system comprising a first processor and a first computer-readable media having stored thereon executable instructions that when executed by the first processor configure the intermediary payment network computer system to perform at least the following:
receive, through a network connection, a digital authorization notification from a primary payment network, wherein:
the digital authorization notification is automatically communicated to the intermediary payment network computer system when a user performs a digital financial transaction with a merchant using a point-of-sale device, and
the digital authorization notification comprises a user financial account number, transaction identification, and a transaction amount value;
map the user financial account number to a client identification value; and
after determining both: 1) a customer associated with the user financial account number has not accepted an offer within a first pre-determined, configured timeframe, and 2) the customer associated with the user financial account number has not been provided the offer within a second pre-determined, configured timeframe, then perform the following:
mapping the transaction amount value to a first obfuscation value within a first obfuscation dataset that is associated with the client identification value, wherein:
the first obfuscation dataset comprises at least the first obfuscation value and at least a second obfuscation value,
both the first obfuscation value and the second obfuscation value are associated with different non-overlapping ranges for potential transaction amount values, and
the transaction amount value is mapped to the first obfuscation value because the transaction amount value falls within the different non-overlapping range associated with the first obfuscation value;
mapping the user financial account number to a user identification number within a user mapping dataset that is associated with the client identification value; and
communicating the first obfuscation value and the client identification value to a third-party loyalty program computer system.

2. The computer system as recited in claim 1, further comprising:
the third-party loyalty program computer system comprising a second processor and a second computer-readable media having stored thereon executable instructions that when executed by the second processor configure the third-party loyalty program computer system to perform at least the following:
calculate an adjusted transaction value by multiplying a first parameter with the first obfuscation value.

3. The computer system as recited in claim 2, wherein the third-party loyalty program computer system further comprises executable instructions that when executed by the second processor configure the third-party loyalty program computer system to perform at least the following:
identify, at the third-party loyalty program computer system using the client identification value, a current rewards balance amount within a rewards balance dataset;
determine loyalty points required to make an offer value; and
map the loyalty points required to make the offer value to a rewards obfuscation value within a rewards obfuscation dataset, wherein the loyalty points required to make the offer value are associated with an upper threshold of the current rewards balance amount that is less than the loyalty points required to make the offer value.

4. The computer system as recited in claim 3, wherein the third-party loyalty program computer system further comprises executable instructions that when executed by the second processor configure the third-party loyalty program computer system to perform at least the following:
  calculate a finalized awards amount by dividing the loyalty points required to make the offer value with a third parameter; and
  communicate the rewards obfuscation value and the offer value to a user device.

5. The computer system as recited in claim 4, further comprising:
  the user device comprising a third processor and a third computer-readable media having stored thereon executable instructions that when executed by the third processor configure the user device to perform at least the following:
    display, on a user interface at the user device, a notification to accept the offer value as a digital financial payment award.

6. The computer system as recited in claim 5, wherein the intermediary payment network computer system, the third-party loyalty program computer system, and the user device are each separate and distinct systems that are remote from each other.

7. The computer system as recited in claim 5, wherein communicating the rewards obfuscation value to the user device comprises communicating the rewards obfuscation value to the intermediary payment network computer system and the intermediary payment network computer system communicating the rewards obfuscation value to the user device.

8. A computer-implemented method for numeric translation, comprising:
  receiving, through a network connection, a digital authorization notification from a primary payment network, wherein:
    the digital authorization notification is automatically communicated to an intermediary payment network computer system in response to a user performing a digital financial transaction with a merchant using a point-of-sale device, and
    the digital authorization notification comprises a user financial account number, transaction identification, and a transaction amount value;
  mapping the user financial account number to a client identification value; and
  after determining both: 1) a customer associated with the user financial account number has not accepted an offer within a first pre-determined, configured timeframe, and 2) the customer associated with the user financial account number has not been provided the offer within a second pre-determined, configured timeframe, then perform the following:
    mapping the transaction amount value to a first obfuscation value within a first obfuscation dataset that is associated with the client identification value, wherein:
      the first obfuscation dataset comprises at least the first obfuscation value and at least a second obfuscation value,
      both the first obfuscation value and the second obfuscation value are associated with different non-overlapping ranges for potential transaction amount values, and
      the transaction amount value is mapped to the first obfuscation value because the transaction amount value falls within the different non-overlapping range associated with the first obfuscation value;
    mapping the user financial account number to a user identification number within a user mapping dataset that is associated with the client identification value; and
    communicating the first obfuscation value and the client identification value to a third-party loyalty program computer system.

9. The computer-implemented method as recited in claim 8, further comprising:
  calculating an adjusted transaction value by multiplying a first parameter with the first obfuscation value.

10. The computer-implemented method as recited in claim 9, further comprising:
  identifying, at the third-party loyalty program computer system using the client identification value, a current rewards balance amount within a rewards balance dataset;
  determining loyalty points required to make an offer value; and
  mapping the loyalty points required to make the offer value to a rewards obfuscation value within a rewards obfuscation dataset, wherein the loyalty points required to make the offer value are associated with an upper threshold of the current rewards balance amount that is less than the adjusted transaction value.

11. The computer-implemented method as recited in claim 10, further comprising:
  calculating a finalized awards amount by dividing the loyalty points required to make the offer value with a third parameter; and
  communicating the rewards obfuscation value to a user device.

12. The computer-implemented method as recited in claim 11, further comprising:
  displaying, on a user interface at the user device, a notification to accept the offer value as a digital financial payment award.

13. The computer-implemented method as recited in claim 12, wherein the intermediary payment network computer system, the third-party loyalty program computer system, and the user device are each separate and distinct systems that are remote from each other.

14. The computer-implemented method as recited in claim 12, wherein communicating the rewards obfuscation value to the user device comprises communicating the rewards obfuscation value to the intermediary payment network computer system and the intermediary payment network computer system communicating the rewards obfuscation value to the user device.

15. A computer-readable media comprising one or more physical computer-readable storage media having stored thereon computer-executable instructions that, when executed at a processor, cause a computer system to perform a method for numeric translation, the method comprising:
  receiving, through a network connection, a digital authorization notification from a primary payment network, wherein:
    the digital authorization notification is automatically communicated to an intermediary payment network computer system in response to a user performing a digital financial transaction with a merchant using a point-of-sale device, and
    the digital authorization notification comprises a user financial account number, transaction identification, and a transaction amount value;
  mapping the user financial account number to a client identification value;

after determining both: 1) a customer associated with the user financial account number has not accepted an offer within a first pre-determined, configured timeframe, and 2) the customer associated with the user financial account number has not been provided the offer within a second pre-determined, configured timeframe, then perform the following:

mapping the transaction amount value to a first obfuscation value within a first obfuscation dataset that is associated with the client identification value, wherein:

the first obfuscation dataset comprises at least the first obfuscation value and at least a second obfuscation value, both the first obfuscation value and the second obfuscation value are associated with different non-overlapping ranges for potential transaction amount values, and the transaction amount value is mapped to the first obfuscation value because the transaction amount value falls within a different non-overlapping range associated with the first obfuscation value;

mapping the user financial account number to a user identification number within a user mapping dataset that is associated with the client identification value; and communicating the first obfuscation value and the client identification value to a third-party loyalty program computer system.

16. The computer-readable media as recited in claim 15, further comprising executable instructions that, when executed at the processor, cause the computer system to perform the method comprising:

calculating an adjusted transaction value by multiplying a first parameter with the first obfuscation value.

17. The computer-readable media as recited in claim 16, further comprising executable instructions that, when executed at the processor, cause the computer system to perform the method comprising:

identifying, at the third-party loyalty program computer system using the client identification value, a current rewards balance amount within a rewards balance dataset;

determining that the adjusted transaction value exceeds the current rewards balance amount; and mapping the adjusted transaction value to a rewards obfuscation value within a rewards obfuscation dataset, wherein the rewards obfuscation value is associated with an upper threshold of the current rewards balance amount that is less than the adjusted transaction value.

18. The computer-readable media as recited in claim 17, further comprising executable instructions that, when executed at the processor, cause the computer system to perform the method comprising:

calculating a finalized awards amount by multiplying a second parameter with the rewards obfuscation value; and communicating the rewards obfuscation value to a user device.

19. The computer-readable media as recited in claim 18, further comprising executable instructions that, when executed at the processor, cause the computer system to perform the method comprising:

displaying, on a user interface at the user device, a notification to accept the rewards obfuscation value as a digital financial payment award.

20. The computer-readable media as recited in claim 19, wherein the intermediary payment network computer system, the third-party loyalty program computer system, and the user device are each separate and distinct systems that are remote from each other.

21. The computer system as recited in claim 1, wherein the first pre-determined, configured timeframe and the second pre-determined, configured timeframe are different timeframes.

22. The computer system as recited in claim 21, wherein the first pre-determined, configured timeframe and the second pre-determined, configured timeframe are identical timeframes.

23. The computer system as recited in claim 22, wherein the first pre-determined, configured timeframe is thirty days and the second pre-determined, configured timeframe is seven days.

\* \* \* \* \*